Sept. 25, 1951     M. C. GLEDHILL     2,569,304
CUTTING TORCH ATTACHMENT
Filed Feb. 3, 1950     2 Sheets-Sheet 1
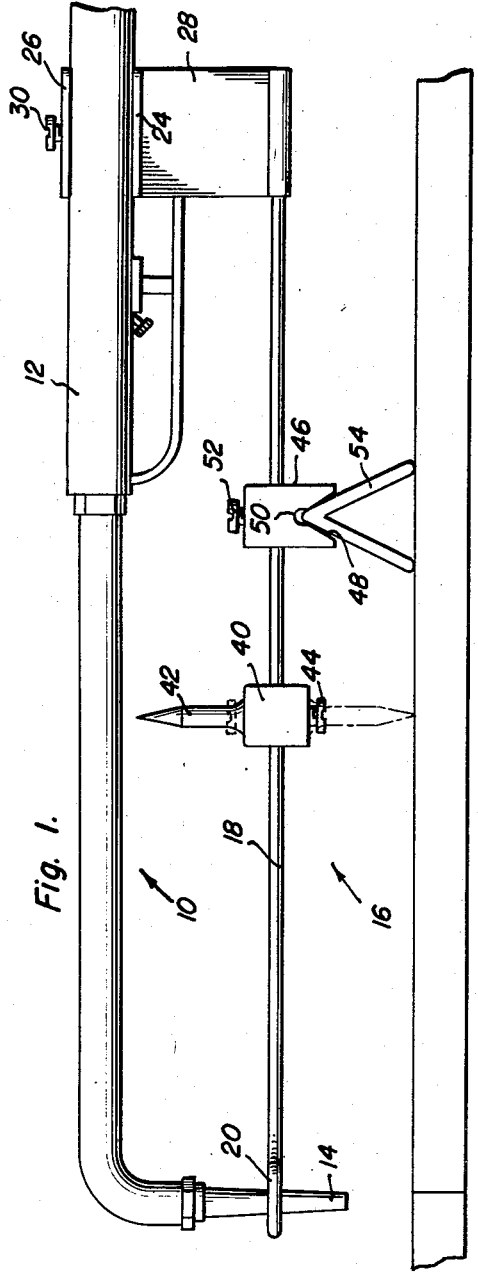
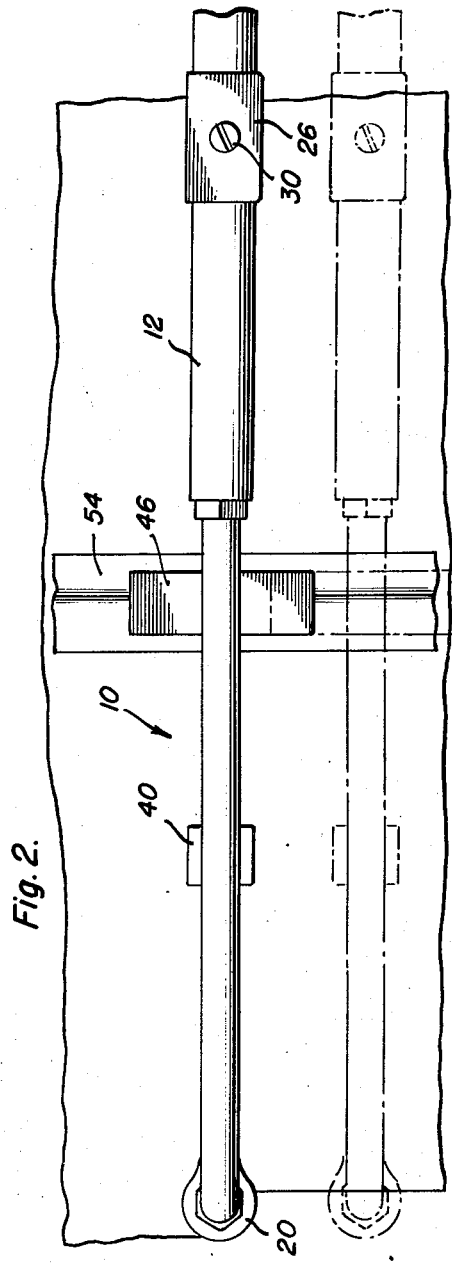
Melvin C. Gledhill
INVENTOR.

Sept. 25, 1951  M. C. GLEDHILL  2,569,304
CUTTING TORCH ATTACHMENT
Filed Feb. 3, 1950  2 Sheets-Sheet 2
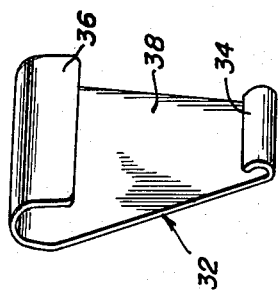
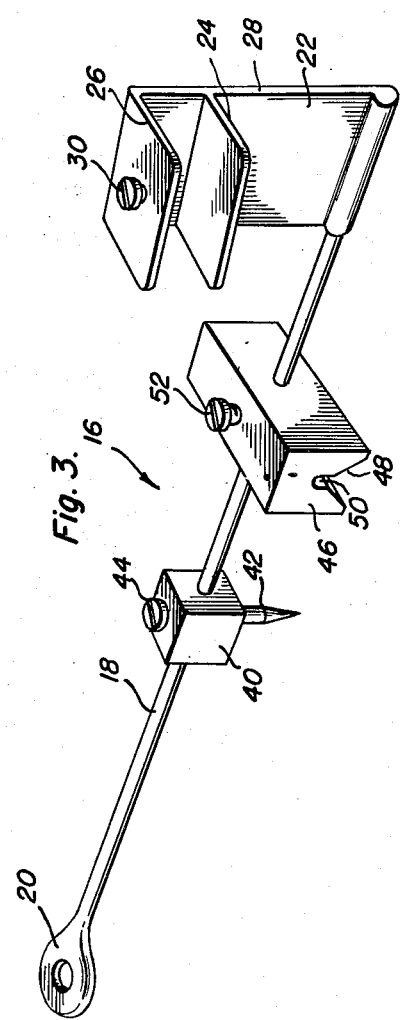
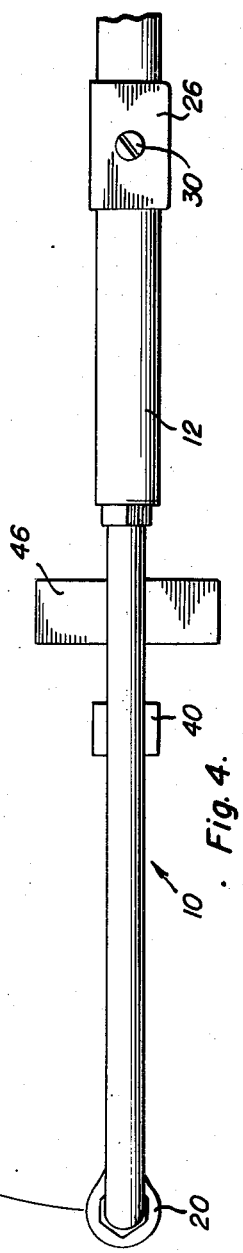
Melvin C. Gledhill
INVENTOR.

Patented Sept. 25, 1951

2,569,304

UNITED STATES PATENT OFFICE 2,569,304

CUTTING TORCH ATTACHMENT

Melvin C. Gledhill, Las Cruces, N. Mex.

Application February 3, 1950, Serial No. 142,241

1 Claim. (Cl. 266—23)

This invention relates to attachments for cutting torches, and more particularly to an attachment for facilitating the cutting of a piece of metal in a straight line.

An object of this invention is to provide a cutting torch attachment which will enable any welder to easily cut straight line, right angles with efficiency and accuracy.

A further object of the invention is to provide for use with an attachment for a cutting torch a guide unit comprising a block having a substantially V-shaped guiding groove therein, the guide unit being selectively rotatable into an inoperative or an operative position depending on whether it is desired to use the attachment for cutting arcs or straight lines.

Yet another object of the invention resides in the provision of means for rigidly securing the attachment to the handle of the cutting torch.

Still further objects of the invention reside in the provision of an attachment for a cutting torch that is strong, durable, highly efficient in operation, simple in construction and manufacture, easy to use, and capable of being readily manufactured at a relatively low cost.

These, together with the various ancillary objects of the invention which will become apparent as the following description proceeds are attained by this attachment for a cutting torch, preferred embodiments of which have been illustrated in the drawings, by way of example only, wherein:

Figure 1 is an elevational view showing the cutting torch with the guide unit in operative emplacement, and with the centering unit in an inoperative position;

Figure 2 is a top plan view of the device shown in Figure 1;

Figure 3 is a perspective view of the cutting torch attachment showing the various elements thereof in great detail with the means for attaching the attachment to the handle of the cutting torch being shown in its preferred embodiment;

Figure 4 is a top plan view of the device showing schematically how the centering unit is used to cut arcs of circles; and Figure 5 is a perspective view of open clip for use in attaching the attachment to the handle of the torch.

With continuing reference to the accompanying drawings wherein like reference numerals designate similar parts throughout the various views, reference numeral 10 generally designates a cutting torch having a handle 12 and a cutting tip 14. This attachment is especially adapted for use with the acetylene type welding torches.

The cutting torch attachment generally designated by the reference numeral 16 comprises a rod 18 of circular cross-section which is formed with an eye 20 which is adapted to be tripped over and into engagement with the cutting tip 14. At the other end of the resilient rod 18 is a clamp 22 which is welded or otherwise secured to the rod 18. The clamp 22 is provided with a pair of parallel spaced plates 24 and 26 secured to a vertically upstanding plate 28. A set screw 30 is provided for rigidly holding the handle 12 of the welding torch between the plates 24 and 26. As shown in Figure 5, an optional member for securing the attachment to the handle of the welding torch is provided. This clamp is generally designated by reference numeral 32 and consists of a pair of loops 34 and 36 formed at the ends of a plate 38. The smaller loop 34 is adapted to engage and have welded therein the rod 18. The larger loop 36 is adapted to slip over the handle 12 and hold it in a substantially clamp-like engagement.

Slidably mounted on the rod 18 and rotatable thereabout is a centering unit comprising a center block 40 which has attached thereto and extending therefrom a pointed pin 42. A set screw 44 is provided for engagement with the rod 18 to hold the centering unit in a predetermined position. In order to use the attachment to enable a welder to cut an arc of a circle, it is merely necessary to provide an arcuate center by using a center punch. Then the pin 42 is merely placed in the depression formed by the center punch and as shown in Figure 4 the cutting torch will readily cut an arc of a circle to form a circular or arcuate shaped work piece.

Also slidably mounted on the rod 18 and rotatable thereabout is a guide unit comprising a guide block 46 of substantially rectangular shape and which is formed with a substantially V-shaped groove 48, the apex of which groove is formed as at 50 in a semi-circular shape. A set screw 52 is provided for selectively holding the block 46 rigidly in a predetermined position. As shown in Figures 1 and 2, the block 46 is slidable on a substantially V-shaped guide bar 54 and to slide thereupon to enable the cutting torch to easily and with accuracy cut a straight line in the work piece.

It is of special importance that the center block 40 and the guide block 46 be rotatable about the rod 18. This is because when it is desired not to use either of these elements it may be rotated out of an operative position into an inoperative position. For if one of the blocks 40 or 46, rotated out of operative position the other may be more readily used without fear of the block in the inoperative position accidentally engaging the work piece and causing errors and inaccuracies.

Since from the foregoing the construction and advantages of this cutting torch attachment are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

Having described the invention, what is claimed as new is:

An attachment for a cutting torch having a cutting tip comprising a rod, means carried by one end of said rod for detachably connecting said rod with said tip, means secured to the other end of said rod for rigidly detachably connecting said rod to the handle of said torch in parallel spaced relation therewith, a guide unit slidably and rotatably mounted on said rod, said guide unit being selectively rotatable on said rod into an inoperative position, means on said guide unit selectively securing said guide unit in an operative position, said guide unit comprising a guide block, a transverse substantially V-shaped groove in said block, the apex of said groove being semi-circular in shape, said guide block being adapted to slidably engage a substantially V-shaped guide bar to guide the tip of said torch in cutting straight lines.

MELVIN C. GLEDHILL.

REFERENCES CITED

The following references are of record in the file of this patent:

UNITED STATES PATENTS

| Number | Name | Date |
|---|---|---|
| 1,141,560 | Lack | June 1, 1915 |
| 1,553,508 | Cloud | Sept. 15, 1925 |
| 1,792,317 | Marsh | Feb. 10, 1931 |
| 2,323,298 | Cook | July 6, 1943 |
| 2,424,286 | Robbins | July 22, 1947 |